Figures 1, 3:
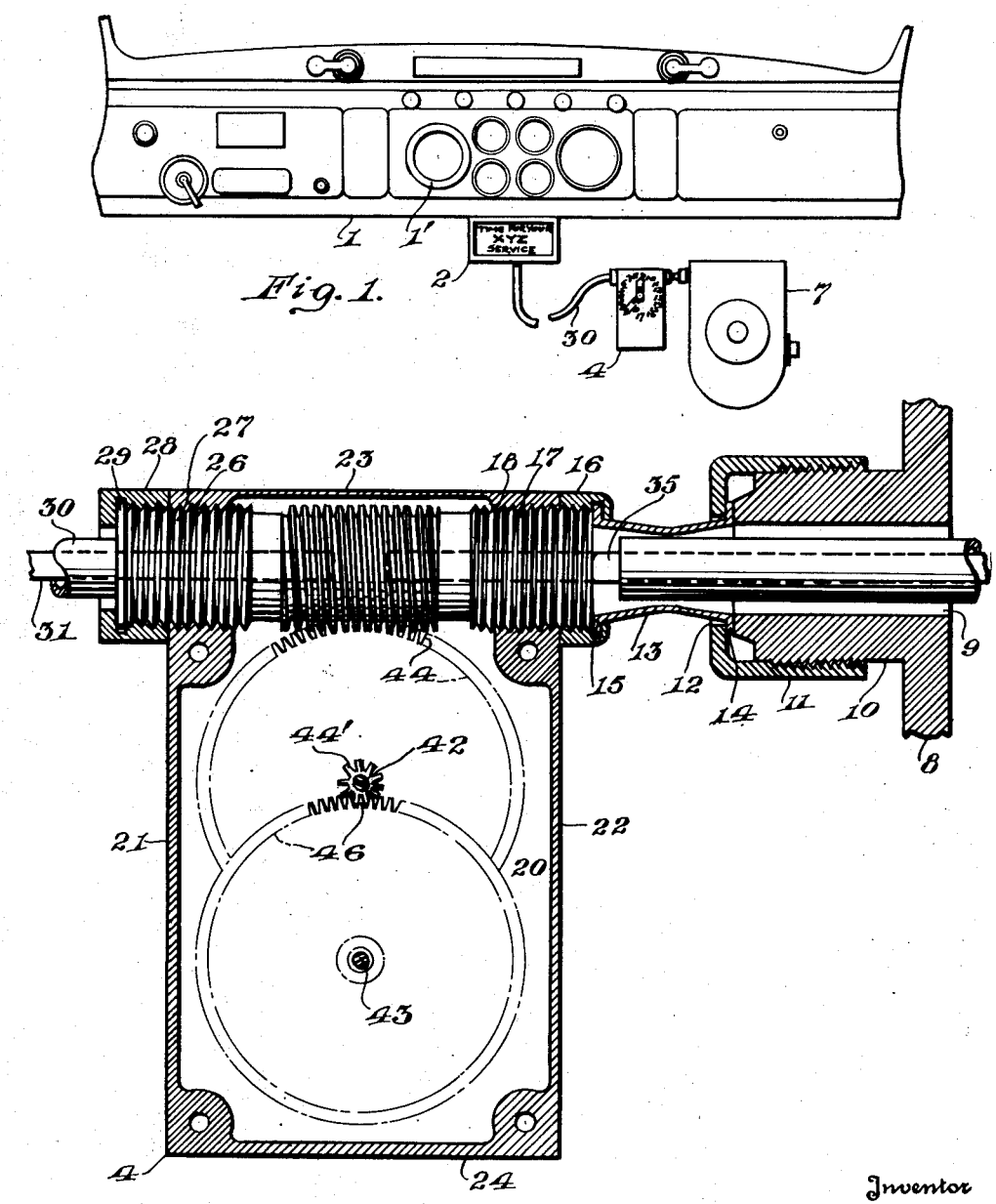

Sept. 22, 1953  A. KELLENBENZ  2,653,205
LUBRICATION WARNING SIGNAL SWITCH
Filed April 14, 1950  2 Sheets-Sheet 1

Inventor
Alexander Kellenbenz

By J. Stuart Freeman
ATTORNEY

Sept. 22, 1953  A. KELLENBENZ  2,653,205
LUBRICATION WARNING SIGNAL SWITCH
Filed April 14, 1950  2 Sheets-Sheet 2
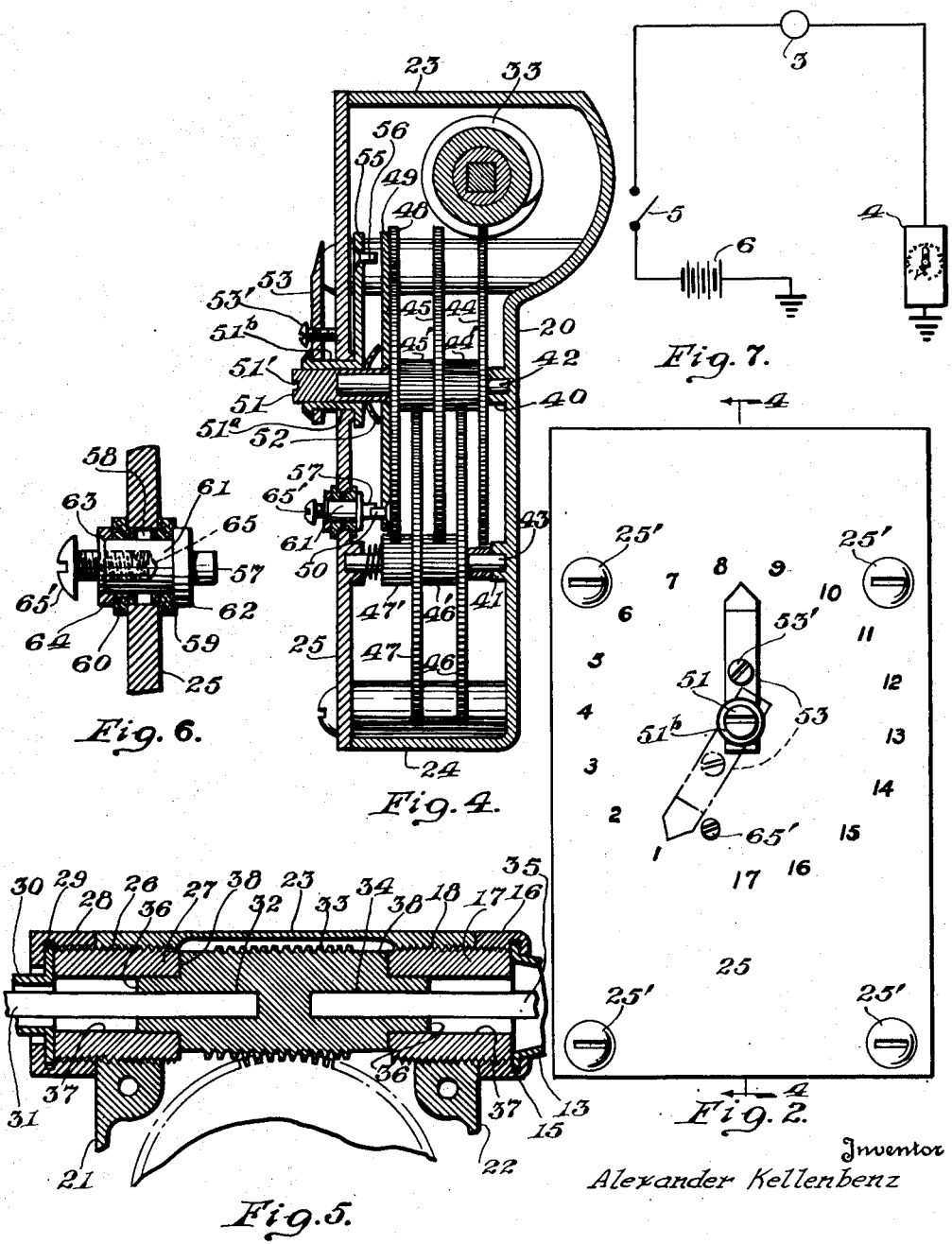
Inventor
Alexander Kellenbenz
By J. Stuart Freeman
ATTORNEY Patented Sept. 22, 1953

2,653,205

UNITED STATES PATENT OFFICE 2,653,205

LUBRICATION WARNING SIGNAL SWITCH

Alexander Kellenbenz, Browns Mills, N. J.

Application April 14, 1950, Serial No. 155,965

5 Claims. (Cl. 200—153)

The object of the invention is to provide improvements in lubrication warning signal switches that are adapted for use with many if not all types of machines, mechanisms, vehicles, etc., that require periodic lubrication, it being understood, however, that throughout the following description and appended claims all references to vehicles in general and to automobiles in particular are to be understood as equally relating to all types of devices and mechanisms to which the invention is applicable. To illustrate more specifically, the invention is as well adapted to be actuated by and for the purpose of counting the strokes of a reciprocatory element, such for example as the movable bed of a planer or shaper, as it is to be actuated by the revolutions of the engine of a motor-driven vehicle or the wheels of the same.

It is a well recognized fact that the great majority of automobile drivers pay little or no attention to the mileage run, and consequently to the need of lubricating the car as a whole, or at least to completely renew the lubricant in the differential, transmission and motor, so that all too frequently the gears become unduly worn and/or one or more bearings burn out before relubrication is seriously thought of. After such a happening, the car owner almost invariably feels that had he been effectively warned by some foolproof automatic means, he would have had the mechanisms of the vehicle properly taken care of.

An object, therefore, is to provide a relatively simple and inexpensive device, that with a minimum of trouble can be operatively inserted between the transmission mechanism and the normally adjacent end of the usual flexible shaft by which power is conveyed to the cyclometer (or so-called "speedometer," of which the actual speed indicating function is but a fractional part) with which all cars are equipped, or which as far as function and operativeness are concerned may be positioned between said flexible shaft and the cyclometer-speedometer unit, or in fact between two sections of such flexible shaft.

Another object is to provide a device of this class, which essentially comprises a speed-reducing mechanism, but which also includes means for presetting such mechanism, whereby the motor and/or wheel revolutions of a vehicle having a known ratio of wheel revolutions to mileage covered will cause the alarm to function after the vehicle has covered a predetermined distance, may be varied, or whereby the device may be set to respond and cause the alarm to function after a given distance by vehicles having different ratios of wheel revolutions to the mileage covered.

A further object is to construct the device in such manner, that the presetting of the device, to accommodate the same to either of the two conditions mentioned, is simply effected from outside the casing that encloses and protects the device's mechanism, and is secured at such desired setting with the utmost simplicity of action and mechanical details.

With a few of the objects thus briefly set forth, the invention comprises further details of construction and operation, which are hereinafter fully brought out in the accompanying specification, when read in conjunction with the accompanying drawings, in which Fig. 1 is a diagrammatic view representing the connections between an alarm signal and a cyclometer carried by or in the vicinity of a representative form of instrument panel, the differential of the car and a device comprising one embodiment of the invention interposed therebetween; Fig. 2 is a front elevational view of the alarm-actuating mechanism per se; Fig. 3 is a vertical section through the device from one side to the other; Fig. 4 is a vertical section substantially on the line 4—4 of Fig. 2; Fig. 5 is a fragmentary vertical longitudinal section through the worm of Fig. 3 and its bearings; Fig. 6 is an enlarged section through the insulated mounting of the electrical lead carried by and upon the front wall of the device; and Fig. 7 is a wiring diagram showing how the device comprising the invention is operatively connected with an alarm element, battery and switch in an electric circuit.

Referring to the drawings, any representative form of automobile instrument panel 1 is shown in Fig. 1 as being provided with any desired type of cyclometer-speedometer 1' and a signal means, which is represented by the casing 2 that depends from said panel, but which instead may comprise an integral part of the panel itself. Within said casing is an electric lamp 3 (Fig. 7), but instead of or in addition to such lamp an audible signal may be employed. If a lamp is used as a visible signal, it may be augmented if desired by a transparent or translucent frontal medium, carrying such a phrase as "Time for Your XYZ Service," or the like. This signal element is electrically connected to and is controlled by the device 4, that comprises the invention hereinafter described in detail, said signal and said device being electrically connected in series (Fig. 7) with a switch 5 and a battery 6, and the circuit if desired being partially completed through grounding the same to the metal frame of the vehicle.

In all modern automobiles, the gearing by means of which the ratio of engine speed with respect to the revolutions of the vehicle wheels is determined, is contained within a protective housing 7, that is customarily termed and hereinafter will be referred to as the transmission, a portion of one wall of which is shown at 8 in Fig. 3 as being provided with an opening 9, surrounded by a laterally protruding externally threaded boss 10, normally covered by means of a similarly threaded cap 11. This cap is provided with a central opening 12 through which extends one end of a generally tubular adapter 13, that has a peripheral flange 14 that is secured between the outer free end of said boss 10 and the inner surface of said cap. The opposite or outer end of said adapter is likewise provided with a peripheral flange 15, that is positioned within an inwardly flanged cap 16, carried by the outer end portion of a threaded bearing bushing 17, that in turn is threaded through an opening 18 in the upper end of one side wall of the new alarm or warning control device 4.

This device comprises a boxlike housing characterized by what will be referred to as a rear wall 20, side walls 21 and 22, a top wall 23 and a bottom wall 24, the front of said housing initially being open and normally spanned by a cover plate or wall 25, secured in place by a plurality of screws 25'. The opening 18 extends through the side wall 22, while a corresponding opening 26 extends through the opposite side wall 21 in alignment with said first wall opening, and in said second wall opening is similarly positioned a second threaded bearing bushing 27, that also protrudes from said housing and carries a cap 28, which surrounds and secures in fixed position the flange 29 of a flexible tube 30, through which rotatably extends what might be termed the driving end of a flexible shaft 31 of square (or at least polygonal) cross section, the opposite end of said shaft being connected to and operative to actuate the usual cyclometer-speedometer 1' on the instrument panel.

The shaft end 31 enters an axially positioned recess of corresponding cross section 32 in a worm gear 33, in the opposite end of which is a similar polygonal recess 34, into which extends a correspondingly shaped shaft 35 that leads outwardly from within the transmission housing. Said worm is preferably provided with reduced end portions 36 that rotate within the axial bores 37 of the said bushings 17 and 27 as bearings for said worm, and with shoulders 38 that slidably engage the adjacent end surfaces of said bushings, to prevent said worm from shifting longitudinally from its predetermined operative position with respect to a gear with which it meshes as hereinafter described.

The inner surface of the rear wall 20 is provided with two apertured bosses 40 and 41 in which are rotatably mounted shafts 42 and 43, respectively, the first mentioned of said shafts carrying a pair of large gears 44 and 45, to which are respectively secured much smaller pinions 44' and 45', while the other of said shafts carries a pair of large gears 46 and 47, respectively provided with attached pinions 46' and 47'. The first of said shafts additionally carries a third large gear 48, which frictionally engages a disc 49 having at one point adjacent to its periphery a fixed lug 50, while axially it is provided with a cylindrical extension 51 surrounded by a spring washer 52, and provided upon its outer freely projecting end with a slot 51'. Thus, the cylindrical extension is used for setting the position of the disc 49 and the lug 50. This extension of said disc projects through an aperture 51a in the cover plate 25, but is centrally spaced from the sides of said aperture by an intervening cylinder 51b, that carries upon its outer end a pointer 53, while its inner end comprises an integral extension of a plate 55, that is provided at one point adjacent to its periphery with a lug 56. Said pointer and plate are secured in any desired angular position with respect to consecutive numerals, or other suitable indicia, upon the outer surface of said cover plate by means of a set screw 53'. Said numerals, which for illustrative purposes progress from "1" to "17," represent pointer-disc settings that correspond with the engine-revolution-to-distance-travelled ratio of various makes of automobiles.

The train of gears and pinions comprise a speed-reducing series, that greatly reduces the effective speed of the transmission-driven shaft 35 in its relation to the pointer 53, so that for one vehicle and corresponding pointer setting at "17," the disc 49 rotates through nearly a complete revolution, while such vehicle is travelling a thousand miles, whereas a pointer setting at "10" for another vehicle having a different ratio will permit said disc to rotate only about one-half of a complete revolution before the lug 50 makes electrical contact with the contact post 57, and thereby energizes the signal 3. The contact post 57 extends through a much larger aperture 58 in said cover plate, and is insulated from metallic contact therewith by means of any suitable arrangement of intervening non-conductive washers 59 and 60, one of which is upon the inner side while the other is upon the outer side of said cover plate. The stop proper is the reduced inner end portion of a stud 61, that has a peripheral flange 62 adjacent to its inner end, while its outer end is upset at 63 in engagement with a metallic washer 64. Said stop is furthermore provided with a threaded axial bore 65 that extends inwardly from its outer end, and adjustably receives a screw 65' by which a lead wire is secured to said stop.

In the operation of this device, it is first installed in the position shown with respect to the transmission and the flexible shaft, that in the absence of said device causes the cyclometer-speedometer to rotate in accordance with the speed of a motor and/or the vehicle wheels. The pointer 53 is preset according to the numerals "1" to "17," to correspond with the speed ratio of the particular vehicle, as hereinbefore referred to, and fixedly set by the screw 53'. In setting said pointer, the lug 56 by engagement with the lug 50 causes the disc 49 to be shifted against frictional engagement with the gear 48, so that when the vehicle is driven the prescribed distance, rotation of said gear 48 will effect corresponding rotation of the lug 50 until it reaches and directly engages the contact post 57 and actuates the alarm or signal. Obviously, if the driver of the vehicle prefers to have the signal function within a less distance, such for example as 500 instead of 1000 miles, he will set the pointer so as to permit said disc 49 and lug 50 to rotate but one-half as far before contact of said lug with said post closes the signal circuit.

Having thus described my invention, what I claim and desire to protect by Letters Patent of the United States is:

1. A circuit closer for a service indicator, comprising a rotatable arm provided with a stop, a shaft rotatable with a vehicle wheel, a reduction gear chain, a disc in frictional engagement with one of the gears of said chain and provided with a contact engageable with said stop in one direction of rotation and operative to engage said first contact as said disc is rotated by said gear chain, said disc being provided with an axial extension journalled in said arm by which said disc can be manually rotated reversely until it engages said stop as a starting point for normal rotation, and means to maintain said arm and said stop in a normally fixed position.

2. A circuit closer for a service indicator, comprising a rotatable arm provided with an axially projecting stop, an indicating pointer rotatable with said arm, means to normally fix the position of said arm, a shaft rotatable with a vehicle wheel, a reduction gear chain, and a disc in frictional engagement with one of the gears of said chain and provided with a contact engageable with said stop in one direction of rotation, and operative to engage said first contact as said disc is rotated by said gear chain in the opposite direction, means between said disk and arm maintaining said frictional engagement, said disc being provided with an axial extension concentric with said arm and by which said disc can be manually rotated reversely until it engages said stop as a starting point.

3. A circuit closer for a service indicator, comprising a rotatable arm provided with an axially projecting stop, an indicating pointer rotatable with said arm, means to normally fix the position of said arm, a shaft rotatable with a vehicle wheel, a reduction gear chain, and a disc in frictional engagement with one of the gears of said chain and provided with a contact engageable with said stop in one direction of rotation, and operative to engage said first contact as said disc is rotated by said gear chain in the opposite direction, said disc being provided with an axial extension by which said disc can be manually rotated reversely until it engages said stop as a starting point, and a shaft for said gear chain projecting through said disc and into an axial bore in said axial extension as a bearing.

4. A circuit closer for a service indicator, comprising a stop, a disc rotatable with a vehicle wheel, a stationary contact, and a second disc in frictional engagement with said first disc, provided with a contact engageable with said stop in one direction of rotation, and operative to engage said first contact as said second disc is rotated by said first disc, means between said disk and arm maintaining said frictional engagement, and means journalled in and extending outwardly beyond said stop operative to manually rotate said second disc until it engages said stop as a starting point for manual rotation, and means to maintain said stop in a normally fixed position.

5. A circuit closer for a service indicator, comprising a rotatable arm provided with an axially projecting stop, an indicating pointer rotatable with said arm, means to normally fix the position of said arm, a disc rotatable concurrently with a vehicle wheel, and a second disc in frictional engagement with said first disc and provided with a contact engageable with said stop in one direction of rotation, and operative to engage said first contact as said second disc is rotated by said first disc in the opposite direction, said second disc being provided with an axial extension by which it can be manually rotated reversely until it engages said stop as a starting point, and a shaft for said first disc projecting through said second disc and into an axial bore in said axial extension as a bearing, said shaft extending through and being journalled in said rotatable arm, and means mounted on said shaft and disposed between said disk and arm maintaining said frictional engagement.

ALEXANDER KELLENBENZ.

References Cited in the file of this patent

UNITED STATES PATENTS

| Number | Name | Date |
|---|---|---|
| 2,130,290 | Polta et al. | Sept. 13, 1938 |
| 2,492,408 | Willcox | Dec. 27, 1949 |

FOREIGN PATENTS

| Number | Country | Date |
|---|---|---|
| 879,088 | France | Nov. 10, 1942 |